United States Patent
Gill, III et al.

(10) Patent No.: US 9,249,851 B2
(45) Date of Patent: Feb. 2, 2016

(54) APPARATUS AND METHOD FOR TUNING A VIBRATORY RESPONSE OF A ROTOR BLADE

(71) Applicant: The Boeing Company, Chicago, IL (US)

(72) Inventors: Frank Joseph Gill, III, Conshohocken, PA (US); Russell Eddy Fay, Newark, DE (US)

(73) Assignee: THE BOEING COMPANY, Chicago, IL (US)

( * ) Notice: Subject to any disclaimer, the term of this patent is extended or adjusted under 35 U.S.C. 154(b) by 580 days.

(21) Appl. No.: 13/676,503

(22) Filed: Nov. 14, 2012

(65) Prior Publication Data

US 2014/0133993 A1 May 15, 2014

(51) Int. Cl.
*F16F 7/10* (2006.01)
*B64C 27/00* (2006.01)

(52) U.S. Cl.
CPC .............. *F16F 7/10* (2013.01); *B64C 27/008* (2013.01); *Y10T 156/1064* (2015.01)

(58) Field of Classification Search
CPC .... F16F 7/10; B64C 27/008; Y10T 156/1064
See application file for complete search history.

(56) References Cited

U.S. PATENT DOCUMENTS

| | | | | |
|---|---|---|---|---|
| 3,105,557 | A * | 10/1963 | Wigal | 416/226 |
| 3,237,697 | A * | 3/1966 | Ford et al. | 416/226 |
| 3,323,597 | A * | 6/1967 | Lougobardi et al. | 416/144 |
| 3,508,843 | A * | 4/1970 | Schmidt | 416/144 |
| 3,574,484 | A | 4/1971 | Lamb, Jr. | |
| 3,812,724 | A * | 5/1974 | Curtz et al. | 73/458 |
| 4,150,920 | A * | 4/1979 | Belko et al. | 416/145 |
| 5,273,398 | A * | 12/1993 | Reinfelder et al. | 416/144 |
| 5,346,367 | A * | 9/1994 | Doolin et al. | 416/230 |
| 5,430,937 | A * | 7/1995 | Leahy et al. | 29/889.6 |
| 6,196,066 | B1 * | 3/2001 | Barbier | 73/456 |
| 7,097,427 | B2 | 8/2006 | Kuhns et al. | |
| 2011/0002785 | A1 | 1/2011 | Cawthorne et al. | |

* cited by examiner

*Primary Examiner* — Igor Kershteyn
(74) *Attorney, Agent, or Firm* — Yee & Associates, P.C.

(57) ABSTRACT

A method and apparatus for reducing a vibratory response in a structure using a tuning object. A selected mass may be identified for the tuning object. A plurality of channels may be formed in a workpiece having a mass greater than the selected mass to form the tuning object having the selected mass. The tuning object may be bonded to the structure using an adhesive bond to reduce the vibratory response of the structure.

25 Claims, 11 Drawing Sheets

APPARATUS AND METHOD FOR TUNING A VIBRATORY RESPONSE OF A ROTOR BLADE

GOVERNMENT LICENSE RIGHTS

This application was made with United States Government support under contract number W58RGZ-04-G-0023 awarded by the United States Army. The United States Government has certain rights in this application.

BACKGROUND INFORMATION

1. Field

The present disclosure relates generally to rotorcraft and, in particular, to the rotor blades of a rotorcraft. Still more particularly, the present disclosure relates to an apparatus and method for tuning the vibratory response of a rotor blade using a tuning object having a plurality of channels.

2. Background

Rotorcraft, such as, for example, without limitation, helicopters, may use rotor blades to generate lift. In some cases, the lift generated by these rotor blades may be varied by changing the twist of each of the rotor blades. However, increasing the twist of each of these rotor blades may cause an increased vibratory response. In other words, increasing the twist of the rotor blades may cause the rotor blades and/or other portions of the rotorcraft to vibrate more than desired. These vibrations may have undesirable effects on the rotorcraft and/or its occupants.

Some currently available solutions for reducing this vibratory response include adhesively bonding one or more objects of known mass to each of the rotor blades at one or more specific locations within the rotor blade. These objects may be referred to as tuning masses or, in some cases, tuning weights. The amount of mass added to a rotor blade and the location at which that mass is added may be selected such that the vibratory response of the rotor blade is "tuned" to within selected tolerances.

As one illustrative example, a plurality of cylindrically shaped objects, each having the same mass, may be bonded to the nose area of a rotor blade. The nose area may be near the leading edge of the rotor blade. However, the number of objects needed to achieve the desired reduction in vibratory response may be greater than desired. For example, without limitation, keeping track of these objects during installation of these objects may become more and more difficult as the number of objects used increases. Further, as the number of objects needed increases, the manufacturing of these objects may become more time-consuming and/or require more effort than is desirable.

In some cases, a single tuning mass may be adhesively bonded to the rotor blade. However, the shear stresses formed within the adhesive bond between the tuning mass and the rotor blade may be greater than desired when the tuning mass is installed at certain locations within the rotor blade. These shear stresses may cause undesired inconsistencies to occur within the adhesive bond and/or may cause the adhesive bond to separate from the tuning mass and/or the rotor blade. Therefore, it would be desirable to have a method and apparatus that takes into account at least some of the issues discussed above, as well as other possible issues.

SUMMARY

In one illustrative embodiment, a tuning object may be configured to be bonded to a structure to reduce a vibratory response of the structure. The tuning object may have a plurality of channels formed such that the tuning object has a selected mass.

In another illustrative embodiment, a rotor blade for a rotorcraft may comprise a composite structure, a tuning object, and an adhesive bond. The tuning object may be configured to be attached to the composite structure to reduce a vibratory response of the rotor blade. The tuning object may have a plurality of channels formed such that the tuning object has a selected mass. The tuning object may comprise a plurality of segments separated by the plurality of channels and a connective segment configured to connect segments in the plurality of segments to each other. The plurality of segments may be monolithic with the connective segment. The adhesive bond may be configured to bond the tuning object to the composite structure. The plurality of channels may be configured to reduce an amount of load transferred to the tuning object from the composite structure through the adhesive bond such that shear stresses in the adhesive bond are reduced to within selected tolerances.

In yet another illustrative embodiment, a method for reducing a vibratory response in a structure using a tuning object may be provided. A selected mass may be identified for the tuning object. A plurality of channels may be formed in a workpiece having a mass greater than the selected mass to form the tuning object having the selected mass. The tuning object may be bonded to the structure using an adhesive bond to reduce the vibratory response of the structure.

In still yet another illustrative embodiment, a method for reducing a vibratory response of a rotor blade for a rotorcraft using a tuning object may be provided. A selected mass may be identified for the tuning object. A plurality of channels may be formed in a workpiece comprised of a material having a density within a selected range by removing portions of material from the workpiece using an electronic discharge machine to form the tuning object having the selected mass. The tuning object may be bonded to a composite structure in the rotor blade using an adhesive bond to reduce the vibratory response of the rotor blade. An amount of load transferred to the tuning object from the composite structure through the adhesive bond may be reduced by the plurality of channels in the tuning object. Shear stresses within the adhesive bond may be reduced by reducing the amount of load transferred to the tuning object from the composite structure through the adhesive bond.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account a number of different considerations. For example, the illustrative embodiments recognize and take into account that it may be desirable to use a single tuning mass at a location in a rotor blade as compared to a plurality of tuning masses. Manufacturing and installing a single tuning mass may be easier and less time-consuming as compared to a plurality of tuning masses.

However, the illustrative embodiments recognize that adhesively bonding a single tuning mass to certain locations within a rotor blade, such as within the mid-span portion of the rotor blade, may cause shear stresses within these adhesive bonds that are greater than desired. The illustrative embodiments recognize and take into account that reducing the amount of load transferred to the tuning mass through the adhesive bond may reduce shear stresses within the adhesive bond.

In particular, the illustrative embodiments recognize and take into account that reducing the maximum length of continuous contact between the tuning mass and the adhesive bond may reduce the amount of load transferred to the tuning mass. Thus, the illustrative embodiments may provide a tuning object configured to be bonded to a structure to reduce a vibratory response of the structure in which the tuning object has a plurality of channels formed such that the tuning object has a selected mass.

The plurality of channels may be configured to reduce an amount of load transferred to the tuning object from the structure through the adhesive bond by reducing a maximum length of continuous contact between the tuning object and the adhesive bond. In other words, the plurality of channels may break up contact between the tuning object and the adhesive bond to reduce the amount of load transferred to the tuning object through the adhesive bond and thereby, reduce shear stresses in the adhesive bond.

Figure 1:
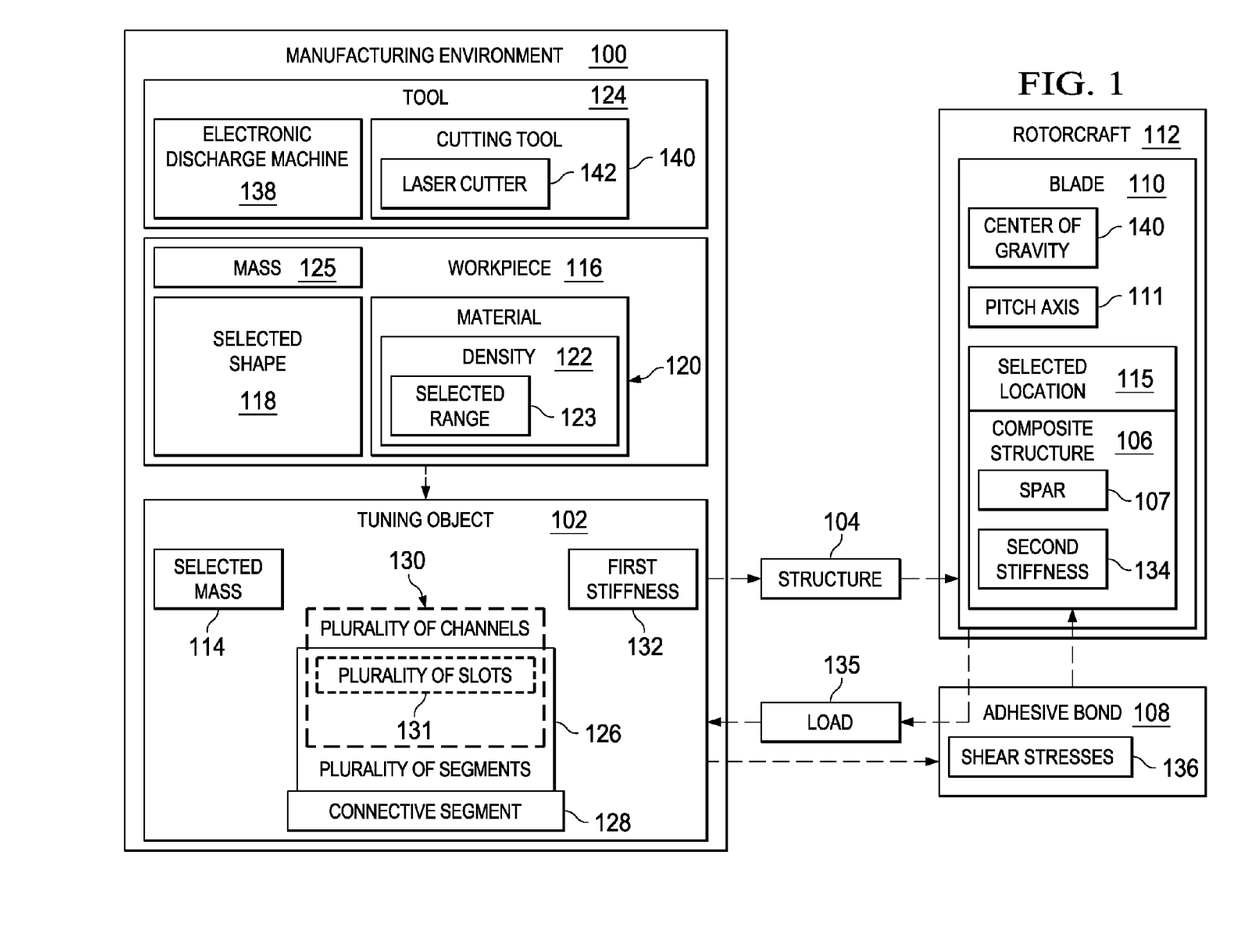
FIG. 1 is an illustration of a manufacturing environment in the form of a block diagram in accordance with an illustrative embodiment.

Referring now to the figures, and with reference to FIG. 1, an illustration of a manufacturing environment in the form of a block diagram is depicted in accordance with an illustrative embodiment. In FIG. 1, manufacturing environment 100 may be an example of an environment in which tuning object 102 may be formed.

In these illustrative examples, tuning object 102 may be configured for use with structure 104. Structure 104 may be any object that may have a vibratory response. Tuning object 102 may be used to add mass to structure 104 to reduce, or "tune", this vibratory response. In this manner, tuning object 102 may also be referred to as a "tuning mass" or, in some cases, a "tuning weight".

As one illustrative example, structure 104 may take the form of blade 110. Blade 110 may be a rotor blade for rotorcraft 112 in this illustrative example. When in flight, the lift generated by rotorcraft 112 may be varied by changing the twist of blade 110. However, increasing the twist of blade 110 may cause increased vibrations to be generated during flight. Tuning object 102 may be installed in blade 110 to add mass to blade 110. This additional mass may reduce the vibrations of blade 110. In this manner, tuning object 102 may be used to change the inertial response of blade 110.

In particular, tuning object 102 may have selected mass 114. Tuning object 102 may be installed in blade 110 at selected location 115 of blade 110 to add selected mass 114 to selected location 115 of blade 110. Selected location 115 may be, for example, without limitation, a location aft of pitch axis 111 through blade 110 or a location forward of pitch axis 111 through blade 110. Selected location 115 may be within a nose area of blade 110, within a mid-span portion of blade 110, or in some other portion of blade 110.

In these illustrative examples, selected location 115 may be a location on composite structure 106 within blade 110. As one illustrative example, composite structure 106 may take the form of spar 107. In particular, spar 107 may be a D-spar. Tuning object 102 may be bonded to composite structure 106 by adhesive bond 108. Adhesive bond 108 may be comprised of a layer of adhesive material that has been cured to bond tuning object 102 to composite structure 106.

In these illustrative examples, tuning object 102 may be formed from workpiece 116. As depicted, workpiece 116 may be comprised of material 120 having density 122 within selected range 123. Selected range 123 for density 122 may be a higher range for density 122. In this manner, material 120 may be a high density material. As used herein, a "high-density material" may be a material having a density that is greater than about 2.0 grams per centimeters cubed ($g/cm^3$) when the material is in a solid phase.

Material 120 may be comprised of one or more materials, depending on the implementation. In these illustrative examples, material 120 may be comprised of tungsten, tantalum, lead, and/or some other type of high-density material. As one illustrative example, material 120 may be sintered tungsten.

Workpiece 116 may be formed having selected shape 118 within manufacturing environment 100. For example, without limitation, a block of sintered tungsten may be machined to form workpiece 116 having selected shape 118. Selected shape 118 may be selected based on selected location 115 of blade 110 at which tuning object 102 is to be installed. In one illustrative example, selected shape 118 may be an elongated prism-type shape with curved edges.

Within manufacturing environment 100, tool 124 may be used to remove portions of material 120 from workpiece 116 to form tuning object 102. Removing portions of material 120 from workpiece 116 reduces mass 125 of workpiece 116. Mass 125 may be greater than selected mass 114. The portions of material 120 may be removed from workpiece 116 to reduce mass 125 of workpiece 116 to selected mass 114, within selected tolerances.

In particular, portions of material 120 may be removed from workpiece 116 at regular and/or irregular intervals along a particular direction with respect to selected shape 118 of workpiece 116 to form plurality of channels 130 in workpiece 116. Plurality of channels 130 may partially segment workpiece 116 into plurality of segments 126 in workpiece 116. In these illustrative examples, each channel in plurality of channels 130 may separate two segments in plurality of segments 126.

In some cases, plurality of channels 130 may take the form of plurality of slots 131. As one illustrative example, tool 124 may cut through workpiece 116 at substantially regular intervals to form plurality of slots 131, and thereby, plurality of segments 126. In particular, each cut may separate two segments in plurality of segments 126. In this example, each cut may lie along a cross-sectional plane through workpiece 116.

However, tool 124 may not cut all the way through the entire cross-section through workpiece 116. Consequently, a portion of workpiece 116 may be left unaltered by tool 124 after plurality of segments 126 is formed. In this manner, workpiece 116 may be considered to be partially segmented.

Connective segment 128 may be the unaltered portion of workpiece 116 that connects segments in plurality of segments 126 to each other. In particular, plurality of segments 126 may be formed such that each of plurality of segments 126 extends from connective segment 128. In this manner, plurality of segments 126 may be considered monolithic with connective segment 128. Connective segment 128 and plurality of segments 126 together form tuning object 102 having selected mass 114.

As depicted, tuning object 102 may have first stiffness 132. Composite structure 106 may have second stiffness 134. First stiffness 132 may be greater than second stiffness 134. In particular, a difference between first stiffness 132 and second stiffness 134 may be greater than some selected threshold.

Movement of blade 110 during flight, such as flapping, may cause bending of blade 110. This bending may cause load 135 to be generated. Load 135 may include any number of forces and/or moments. In particular, load 135 may travel through composite structure 106 and be transferred to tuning object 102 through adhesive bond 108.

The amount of load 135 transferred to tuning object 102 may be determined by the length of continuous contact between tuning object 102 and adhesive bond 108. Plurality of channels 130 may break up contact between tuning object 102 and adhesive bond 108 such that the maximum length of continuous contact between tuning object 102 and adhesive bond 108 is reduced to the length of each segment in plurality of segments 126. Amount of load 135 transferred to tuning object 102 having plurality of channels 130 may be less than if the entire length of tuning object 102 were in contact with adhesive bond 108.

The amount of load 135 transferred to tuning object 102 may determine shear stresses 136 within adhesive bond 108. Plurality of segments 126 may be configured such that the amount of load 135 transferred to tuning object 102 is reduced, thereby reducing shear stresses 136 within adhesive bond 108.

Thus, segmenting workpiece 116 using tool 124 provides an efficient and quick method for forming tuning object 102. Plurality of channels 130 may reduce shear stresses 136 within adhesive bond 108 such that the strength and integrity of adhesive bond 108 may be be maintained. In other words, the possibility of undesired inconsistencies occurring within adhesive bond 108 and/or a portion of adhesive bond 108 separating from tuning object 102 and/or composite structure 106 in response to shear stresses 136 may be reduced to within selected tolerances.

The length that is needed for each segment in plurality of segments 126 and/or each channel in plurality of channels 130 to reduce shear stresses 136 to within selected tolerances may be selected based on a number of different factors. These factors may include, for example, without limitation, first stiffness 132 of tuning object 102, second stiffness 134, a thickness of adhesive bond 108, properties of the adhesive material that forms adhesive bond 108, and/or other factors.

Additionally, the number of segments formed in plurality of segments 126, the size of each of plurality of segments 126, and the size of each of plurality of channels 130 may be selected such that tuning object 102 is formed having selected mass 114. However, once plurality of segments 126 has been formed, the mass of tuning object 102 may need to be confirmed. For example, without limitation, tuning object 102 may be weighed.

Tool 124 may be used to further process tuning object 102 if the mass of tuning object 102 is not substantially equal to selected mass 114 within selected tolerances. For example, without limitation, tool 124 may be used to increase the length of one or more channels in plurality of channels 130 to reduce the mass of tuning object 102. In another example, tool 124 may be used to remove one or more segments in plurality of segments 126 to reduce the mass of tuning object 102.

In these illustrative examples, tool 124 may take a number of different forms. Tool 124 may take the form of, for example, without limitation, electronic discharge machine (EDM) 138, cutting tool 140, or some other type of tool or machine. Cutting tool 140 may be, for example, without limitation, laser cutter 142. Of course, in other illustrative examples, cutting tool 140 may be some other type of tool.

As described above, installation of tuning object 102 at selected location 115 in blade 110 may include adhesively bonding tuning object 102 to composite structure 106 in blade 110. In some cases, bonding tuning object 102 to composite structure 106 may change center of gravity 140 of blade 110. In some illustrative examples, one or more additional tuning objects implemented in a manner similar to tuning object 102 may be attached to blade 110 at selected locations to change center of gravity 140 of blade 110. Any number of tuning objects may be used to adjust the inertial response of blade 110.

Tuning object 102 may be configured such that once tuning object 102 is installed, plurality of channels 130 may further extend into connective segment 128 without increasing the vibratory response of rotor blades outside of selected tolerances. For example, without limitation, tuning object 102 may become fully segmented such that connective segment 128 is no longer present without causing any undesired effects on the performance of blade 110.

The illustration of manufacturing environment 100 and tuning object 102 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 2:
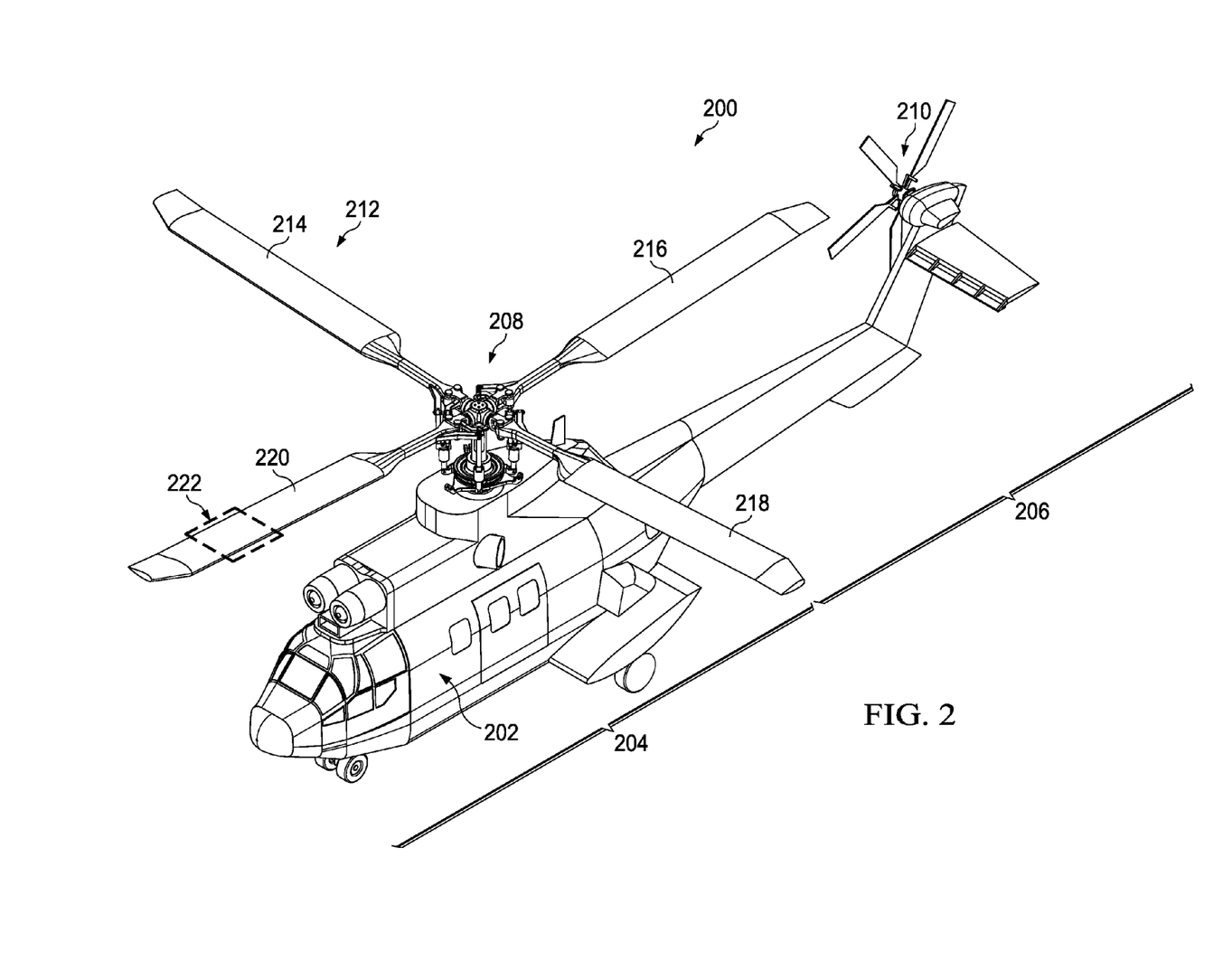
FIG. 2 is an illustration of a top isometric view of a rotorcraft in accordance with an illustrative embodiment.

With reference now to FIG. 2, an illustration of a top isometric view of a rotorcraft is depicted in accordance with an illustrative embodiment. In this illustrative example, rotorcraft 200 may be an example of one implementation for rotorcraft 112 in FIG. 1. As depicted, rotorcraft 200 may include body 202, which may be comprised of main section 204 and tail section 206. Further, rotorcraft 200 may also include rotor system 208 and tail rotor system 210.

In this illustrative example, rotorcraft 200 may include plurality of blades 212. Plurality of blades 212 may include blades 214, 216, 218, and 220. Each of blades 214, 216, 218, and 220 may be an example of one implementation for blade 110 in FIG. 1. Section 222 of blade 220 is depicted in greater detail in FIG. 3 below.

Figure 3:
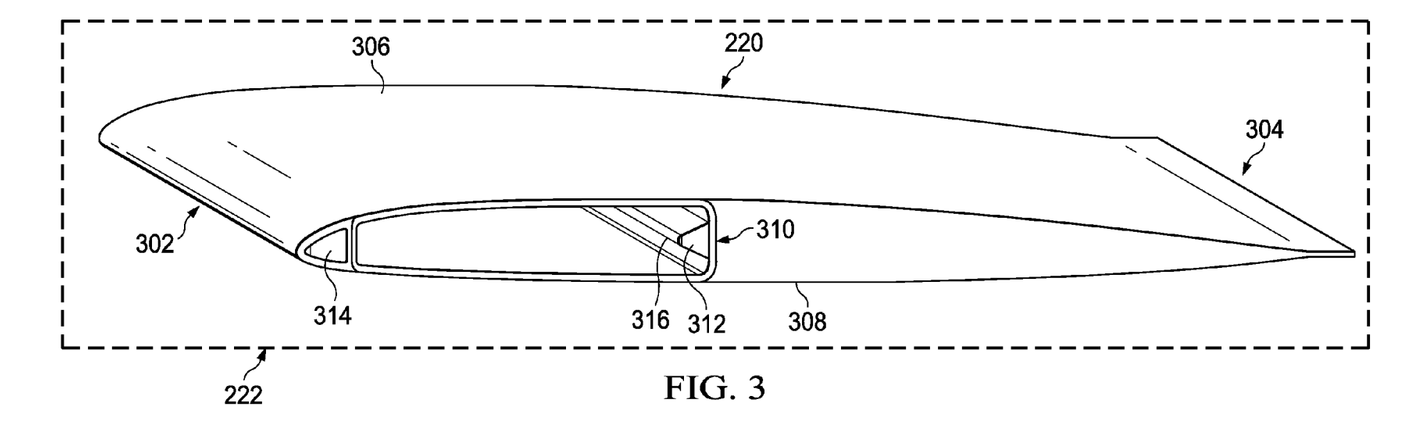
FIG. 3 is an illustration of a section of a blade in accordance with an illustrative embodiment.

With reference now to FIG. 3, an illustration of section 222 of blade 220 from FIG. 2 is depicted in accordance with an illustrative embodiment. As depicted in FIG. 3, blade 220 may have leading edge 302 and trailing edge 304. Further, blade 220 may have first surface 306 and second surface 308. In this illustrative example, a portion of first surface 306 and second surface 308 may be formed by spar 310. Spar 310 may take the form of a D-spar in this example.

As depicted, tuning object 312 and tuning object 314 may be associated with blade 220. Tuning object 312 and tuning object 314 may be examples of implementations for tuning object 102 in FIG. 1. Both tuning object 312 and tuning object 314 may be used to tune the sectional mass of blade 220 to a desired mass within selected tolerances. Tuning object 312 and tuning object 314 may be adhesively bonded to spar 310 at different locations.

In particular, an adhesive material (not shown in this view) may be used at each of the surfaces of tuning object 312 and tuning object 314 to bond these tuning objects to spar 310 during the formation of blade. Further, laminate wrap 316 may be placed over the exposed portion of the adhesive material over tuning object 312. Laminate wrap 316 may be a layer of composite material in this illustrative example.

The adhesive material (not shown in this view) and laminate wrap 316 may be cured to bond tuning object 312 and tuning object 314 to spar 310 during the formation of blade 220 such that both tuning object 312 and tuning object 314 become bonded to spar 310. Laminate wrap 316 may be used to hold tuning object 312 in place relative to spar 310.

Figure 4:
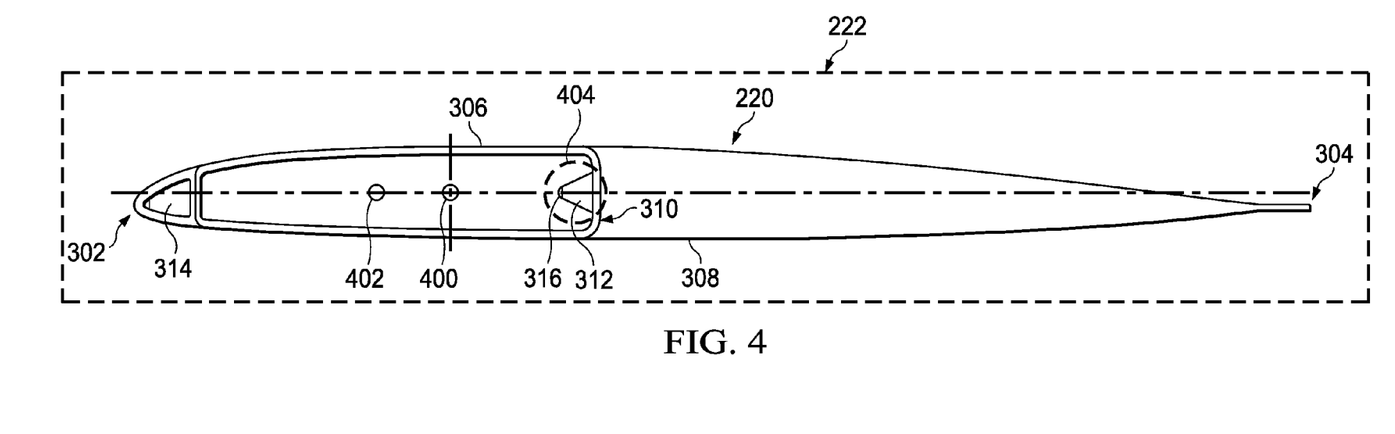
FIG. 4 is an illustration of a section of a blade in accordance with an illustrative embodiment.

With reference now to FIG. 4, an illustration of section 222 of blade 220 from FIG. 3 is depicted in accordance with an illustrative embodiment. In this illustrative example, pitch axis 400 through blade 220 may be the axis about which blade 220 may be rotated. As depicted, blade 220 may have center of gravity 402 located forward of pitch axis 400.

Tuning object 312 and tuning object 314 may have been used with blade 220 to ensure that center of gravity 402 of blade 220 does not lie forward of pitch axis 400 by more than a selected threshold. An enlarged view of section 404 may be depicted in FIG. 5 below.

Figures 5, 6:
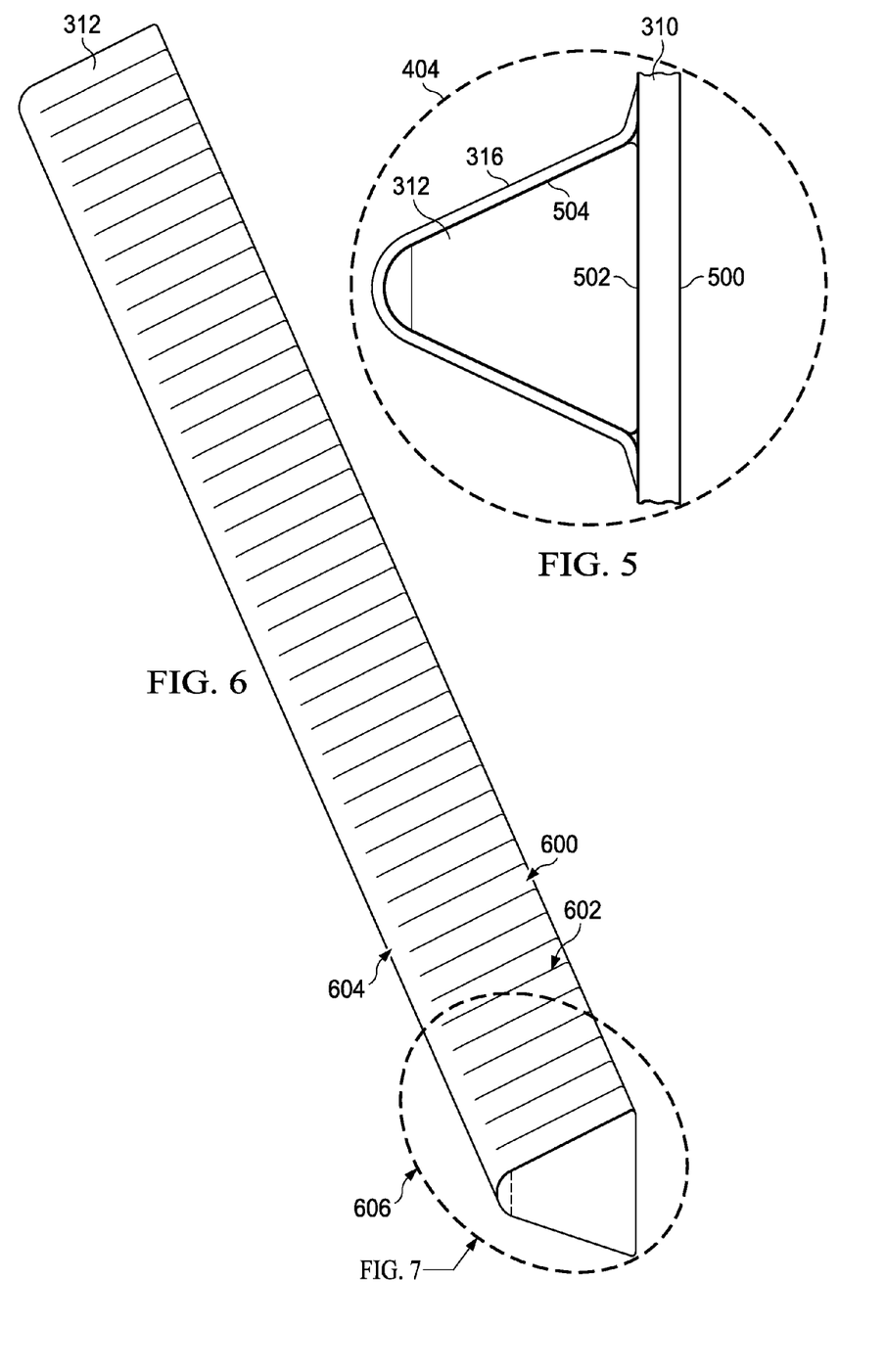
FIG. 5 is an illustration of an enlarged view of a section of a blade with a tuning object in accordance with an illustrative embodiment.
FIG. 6 is an illustration of an isometric view of a tuning object in accordance with an illustrative embodiment.

Turning now to FIG. 5, an illustration of an enlarged view of section 404 of blade 220 with tuning object 312 from FIG. 4 is depicted in accordance with an illustrative embodiment. As depicted, tuning object 312 may be positioned on surface 500 of spar 310.

Laminate wrap 316, adhesive bond 502, and adhesive bond 504 may hold tuning object 312 in place relative to surface 500 of spar 310. In particular, adhesive bond 502 may bond tuning object 312 to surface 500 of spar 310. Adhesive bond 502 may be comprised of a layer of adhesive material that has been cured to bond tuning object 312 to surface 500 of spar 310. Adhesive bond 504 may bond laminate wrap 316 to tuning object 312 and spar 310. Adhesive bond 504 may be comprised of an additional layer of adhesive material that has been placed over tuning object 312 and a portion of surface 500 and then cured to bond laminate wrap 316 to tuning object 312 and spar 310.

With reference now to FIG. 6, an illustration of an isometric view of tuning object 312 separate from blade 220 is depicted in accordance with an illustrative embodiment. As depicted, tuning object 312 may include plurality of segments 600 separated by plurality of slots 602. Plurality of segments 600 may be an example of one implementation for plurality of segments 126 in FIG. 1. Plurality of slots 602 may be an example of one implementation for plurality of slots 131 in FIG. 1.

In this illustrative example, plurality of segments 600 may extend from connective segment 604. In particular, plurality of segments 600 and connective segment 604 may have been formed from a same workpiece. Connective segment 604 may connect all of plurality of segments 600 together. Plurality of segments 600 may have been formed such that connective segment 604 and plurality of segments 600 together have a selected mass. An enlarged view of portion 606 of tuning object 312 is depicted in FIG. 7 below.

Figure 7:
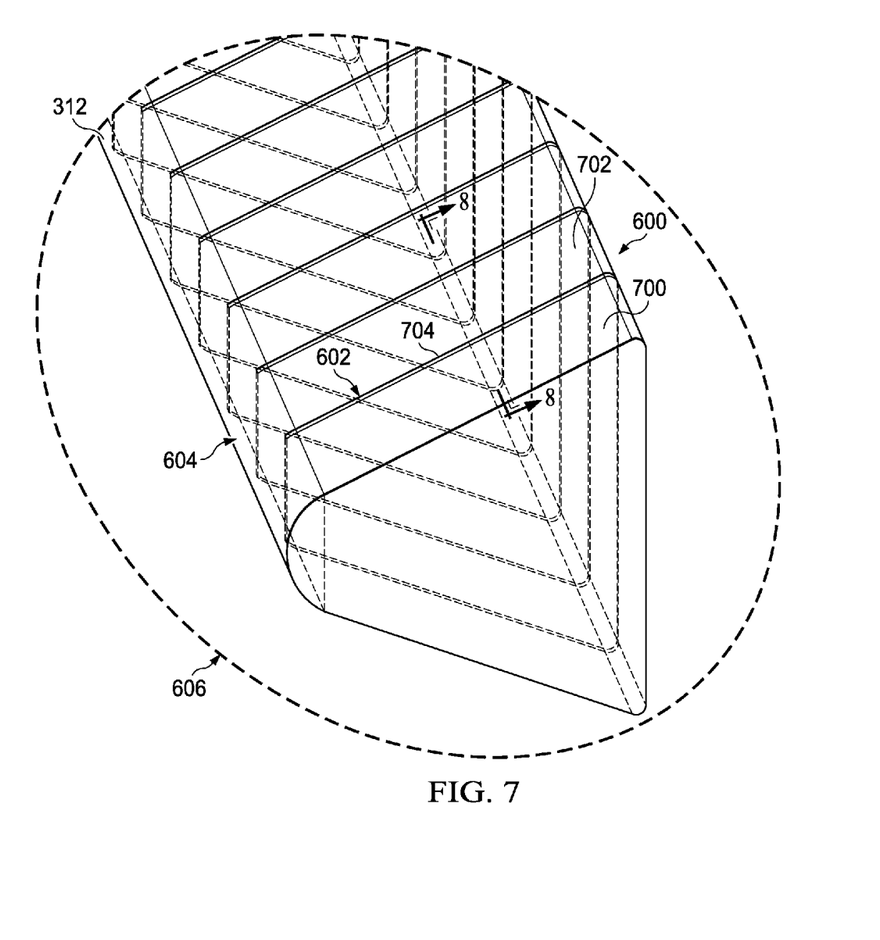
FIG. 7 is an illustration of an enlarged isometric view of a portion of a tuning object in accordance with an illustrative embodiment.

With reference now to FIG. 7, an illustration of an enlarged isometric view of portion 606 of tuning object 312 from FIG. 6 is depicted in accordance with an illustrative embodiment. As depicted, segment 700 and segment 702 may be examples of segments in plurality of segments 600. Segment 700 and segment 702 may be separated by slot 704. Further, slot 704 may be an example of one of plurality of slots 602. As depicted, slot 704 may not extend all the way through tuning object 312. Rather, slot 704 may only extend up to connective segment 604.

Figure 8:
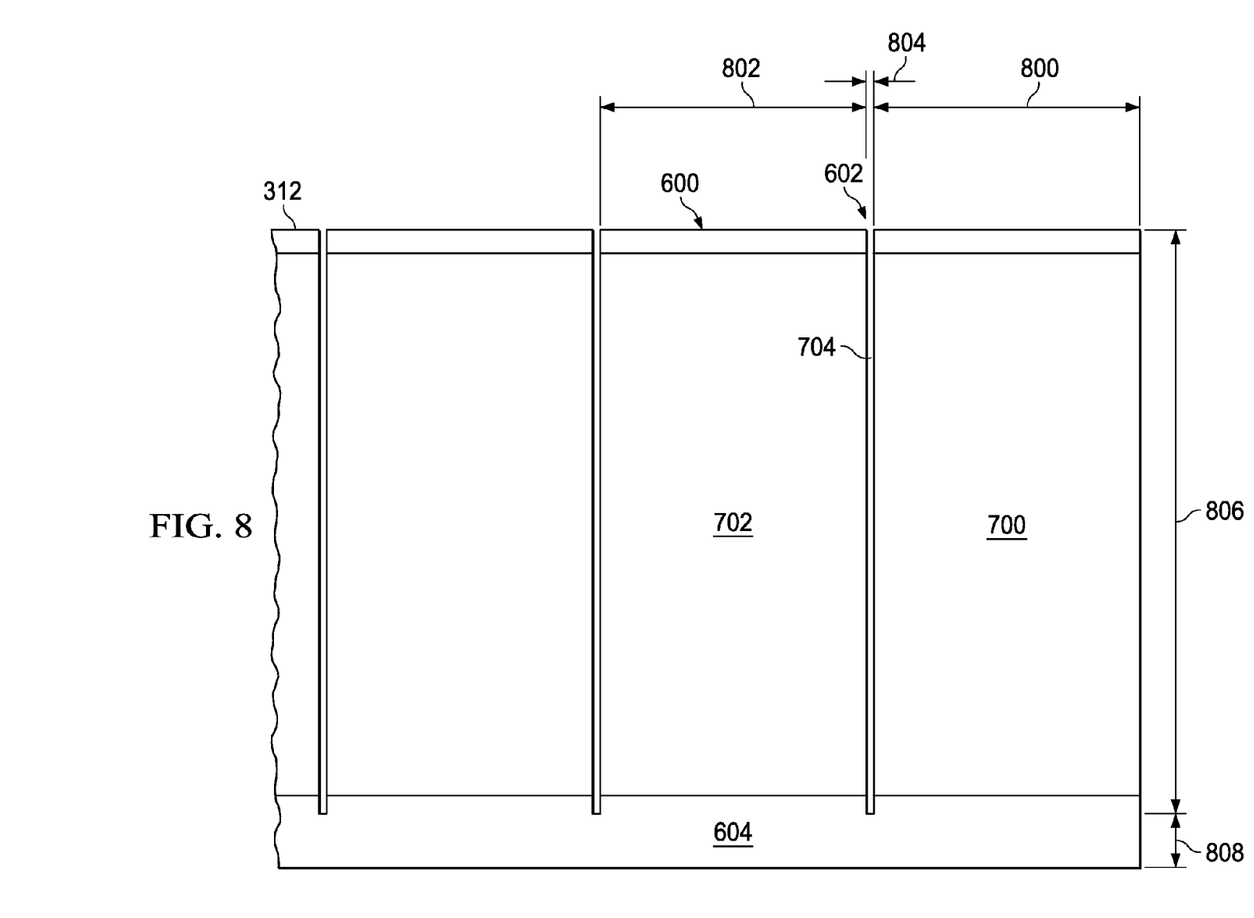
FIG. 8 is an illustration of a portion of a tuning object in accordance with an illustrative embodiment.

Turning now to FIG. 8, an illustration of portion 606 of tuning object 312 from FIG. 7 taken along lines 8-8 in FIG. 7 is depicted in accordance with an illustrative embodiment. In this illustrative example, segment 700 may have length 800, while segment 702 may have length 802. Length 800 and length 802 may be substantially equal. In one illustrative example, length 800 and length 802 may be about 0.4 inches. Each of plurality of segments 600 may have substantially the same length as segment 700 and segment 702.

Further, slot 704 may have length 804. Length 804 may be about 0.005 inches in this illustrative example. Each of plurality of slots 602 may have substantially the same length as slot 704. In other illustrative examples, the lengths of segments and/or slots in tuning object 312 may be described as widths.

As depicted, segment 700 may have height 806. Height 806 may be about 1.2 inches. Each of plurality of segments 600 may have substantially the same height as segment 700. Further, connective segment 604 may have height 808. Height 808 may be about 0.2 inches. Height 808 may be substantially constant along the length of connective segment 604 in this illustrative example.

Figure 9:
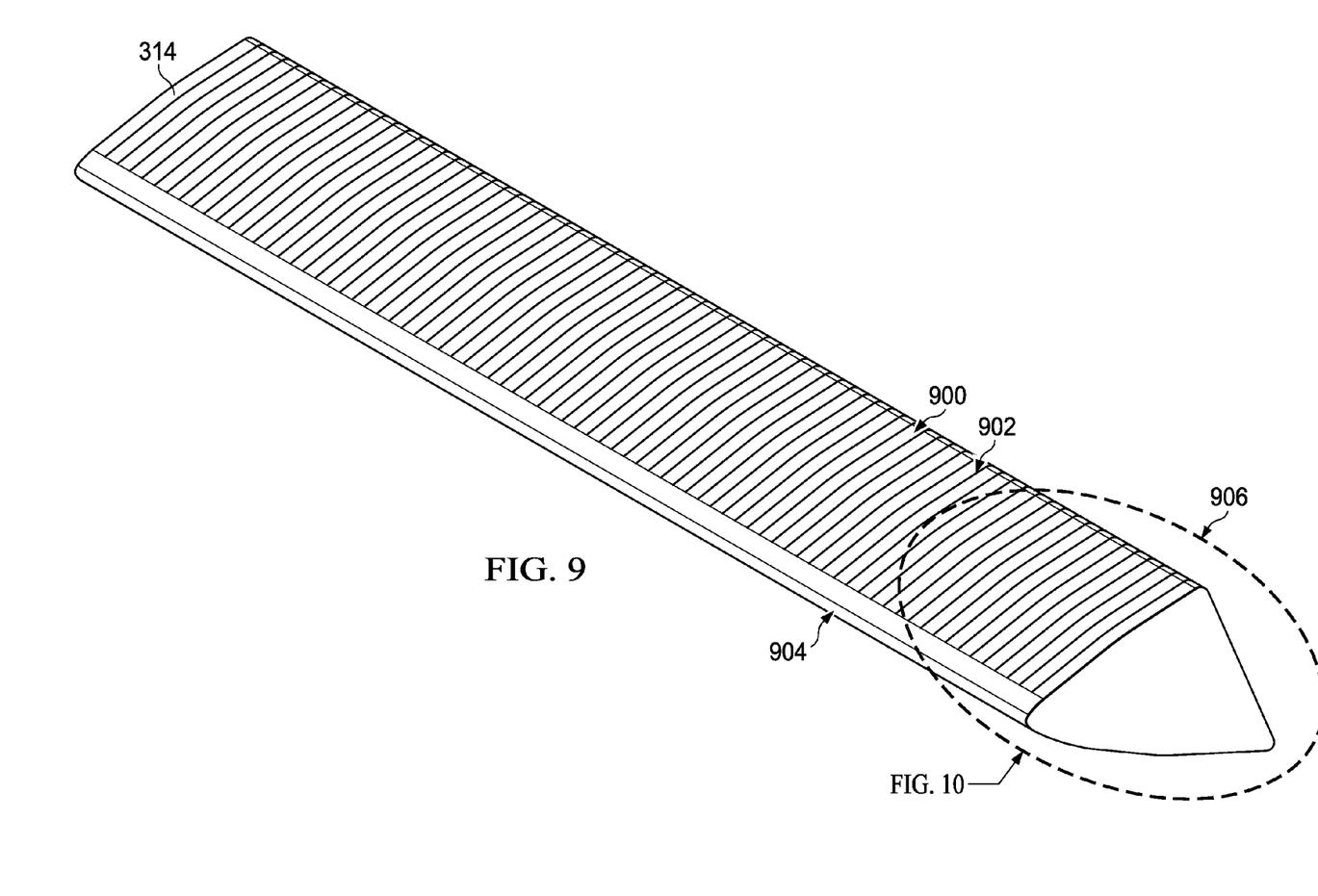
FIG. 9 is an illustration of an isometric view of a tuning object in accordance with an illustrative embodiment.

With reference now to FIG. 9, an illustration of an isometric view of tuning object 314 separate from blade 220 is depicted in accordance with an illustrative embodiment. Tuning object 314 may have a shape that is similar but different from tuning object 312 in FIG. 6.

As depicted, tuning object 314 may include plurality of segments 900 separated by plurality of slots 902. Plurality of segments 900 may be an example of one implementation for plurality of segments 126 in FIG. 1. Plurality of slots 902 may be an example of one implementation for plurality of slots 131 in FIG. 1.

In this illustrative example, plurality of segments 900 may extend from connective segment 904. In particular, plurality of segments 900 and connective segment 904 may have been formed from a same workpiece. Connective segment 904 may connect all of plurality of segments 900 together. Plurality of segments 900 may have been formed such that connective segment 904 and plurality of segments 900 together have a selected mass. An enlarged view of portion 906 of tuning object 314 is depicted in FIG. 10 below.

Figure 10:
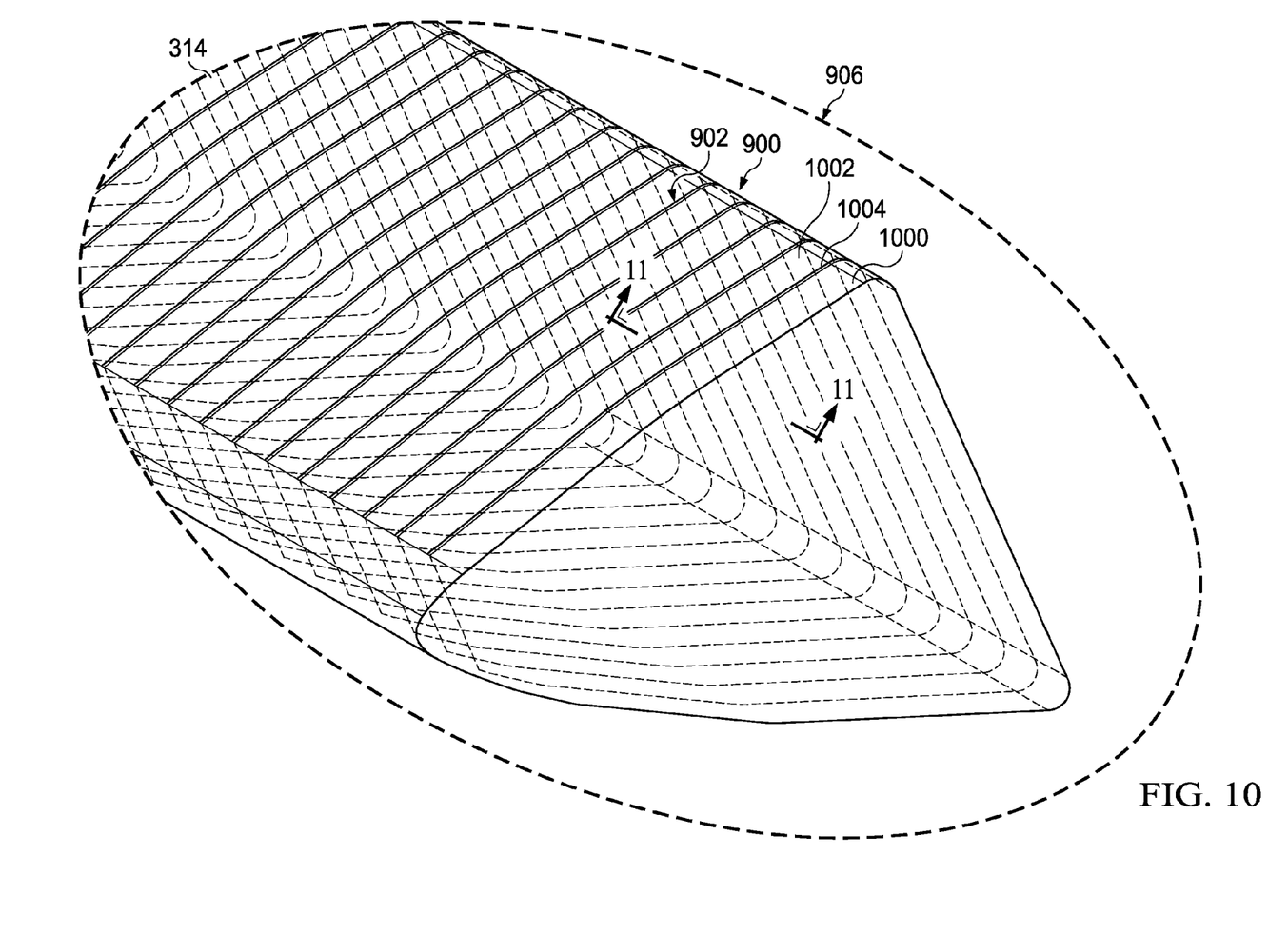
FIG. 10 is an illustration of an enlarged isometric view of a portion of a tuning object in accordance with an illustrative embodiment.

With reference now to FIG. 10, an illustration of an enlarged isometric view of portion 906 of tuning object 314 from FIG. 9 is depicted in accordance with an illustrative embodiment. As depicted, segment 1000 and segment 1002 may be examples of segments in plurality of segments 900. Segment 1000 and segment 1002 may be separated by slot 1004. Further, slot 1004 may be an example of one of plurality of slots 902. As depicted, slot 1004 may not extend all the way through tuning object 314. Rather, slot 1004 may only extend up to connective segment 904.

Figure 11:
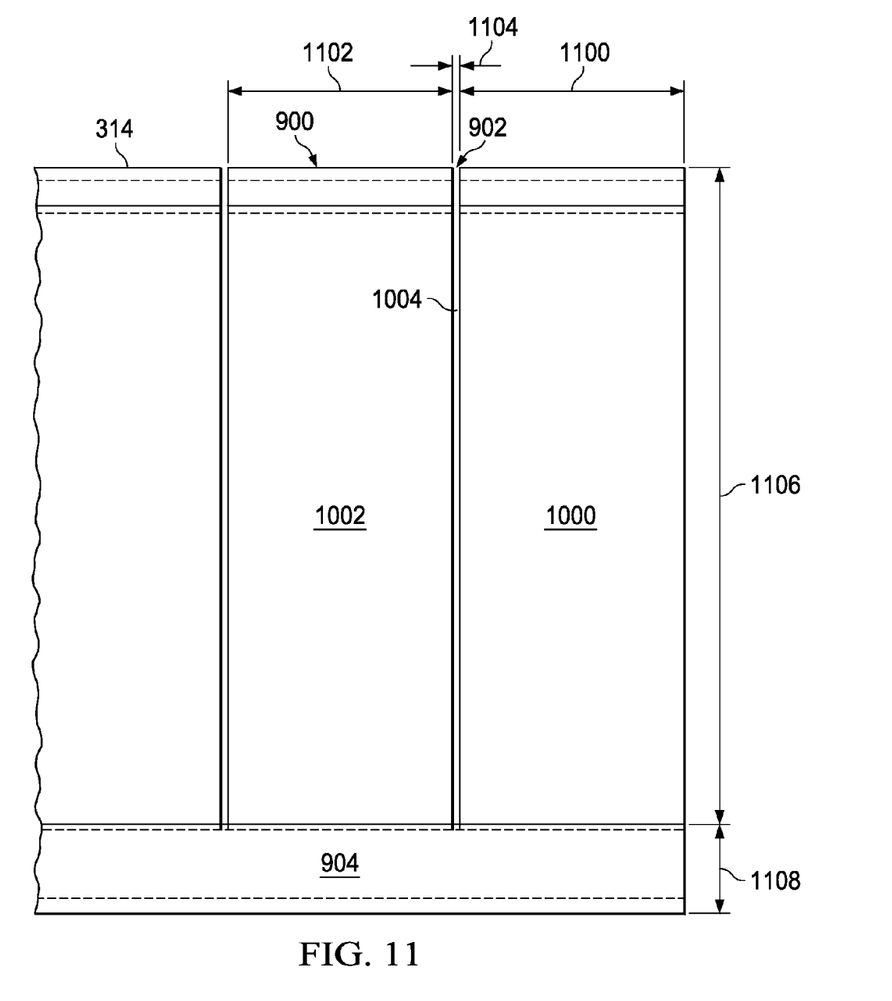
FIG. 11 is an illustration of a portion of a tuning object in accordance with an illustrative embodiment.

Turning now to FIG. 11, an illustration of portion 906 of tuning object 314 taken along lines 11-11 in FIG. 10 is depicted in accordance with an illustrative embodiment. In this illustrative example, segment 1000 may have length 1100, while segment 1002 may have length 1102. Length 1100 and length 1102 may be substantially equal. In one illustrative example, length 1100 and length 1102 may be about 0.4 inches. Each of plurality of segments 900 may have substantially the same length as segment 1000 and segment 1002.

Further, slot 1004 may have length 1104. Length 1104 may be about 0.005 inches. Each of plurality of slots 902 may have substantially the same length as slot 1004.

As depicted, segment 1000 may have height 1106. Height 1106 may be about 1.2 inches. Each of plurality of segments 900 may have substantially the same height as segment 1000. Further, connective segment 904 may have height 1108. Height 1108 may be about 0.2 inches. Height 1108 may be substantially constant along the length of connective segment 904 in this illustrative example.

The illustrations of rotorcraft 200 in FIG. 2, section 222 of blade 220 in FIGS. 3-4, section 404 of blade 220 in FIG. 5, tuning object 312 in FIGS. 6-8, and tuning object 314 in FIGS. 9-11 are not meant to imply physical or architectural limitations to the manner in which an illustrative embodiment may be implemented. Other components in addition to or in place of the ones illustrated may be used. Some components may be optional.

Additionally, some of the components in FIGS. 2-11 may be illustrative examples of how components shown in block form in FIG. 1 may be implemented as physical structures. The different components shown in FIGS. 2-11 may be combined with components in FIG. 1, used with components in FIG. 1, or a combination of the two.

Figure 12:
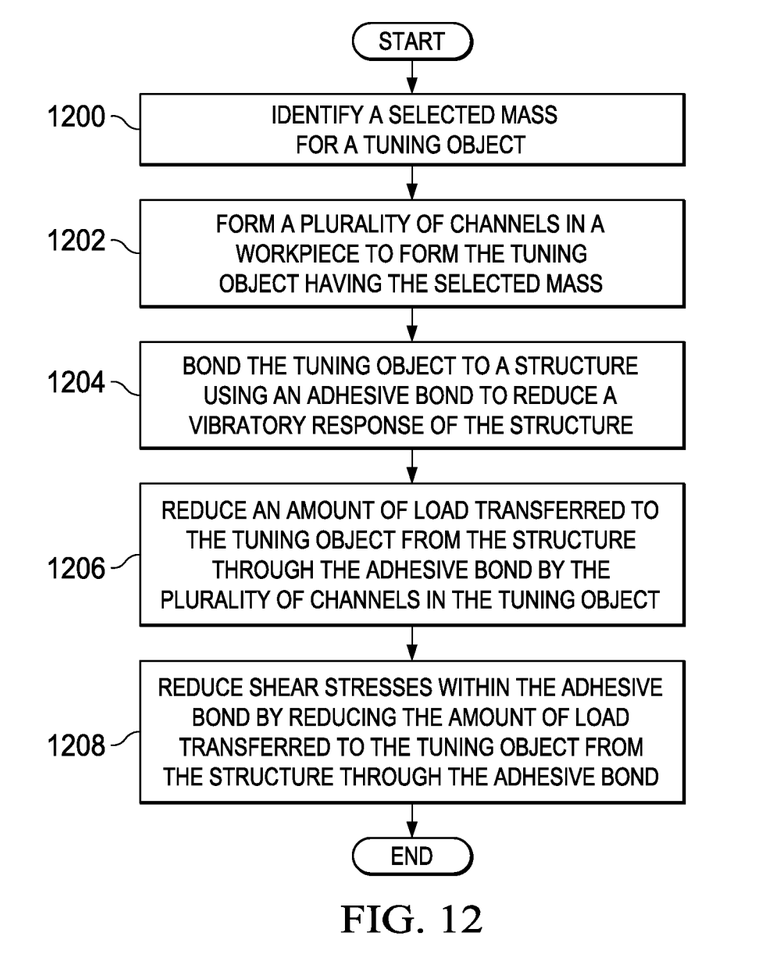
FIG. 12 is an illustration of a process for reducing a vibratory response of a structure using a tuning object in the form of a flowchart in accordance with an illustrative embodiment.

With reference now to FIG. 12, an illustration of a process for reducing a vibratory response of a structure using a tuning object in the form of a flowchart is depicted in accordance with an illustrative embodiment. The process illustrated in FIG. 12 may be implemented within manufacturing environment 100 in FIG. 1 to reduce a vibratory response of structure 104 using tuning object 102 in FIG. 1.

The process may begin by identifying selected mass 114 for tuning object 102 (operation 1200). Thereafter, plurality of channels 130 may be formed in workpiece 116 to form tuning object 102 having selected mass 114 (operation 1202). Workpiece 116 may be comprised of material 120 having density 122 within selected range 123. In operation 1202, plurality of channels 130 may be formed by removing portions of material 120 from workpiece 116 using tool 124. Tool 124 may be, for example, electronic discharge machine 138.

The formation of plurality of channels 130 may partially segment workpiece 116 into plurality of segments 126. The segments in plurality of segments 126 may be connected to each other by connective segment 128, which may be the portion of workpiece 116 into which plurality of channels 130 do not extend.

Next, tuning object 102 may be bonded to structure 104 using adhesive bond 108 to reduce the vibratory response of structure 104 (operation 1204). When structure 104 takes the form of blade 110, tuning object 102 may be bonded to composite structure 106 in blade 110 using adhesive bond 108.

The amount of load 135 transferred to tuning object 102 from structure 104 through adhesive bond 108 may be reduced by plurality of channels 130 in tuning object 102 (operation 1206). Further, shear stresses 136 within adhesive bond 108 may be reduced by reducing the amount of load 135 transferred to tuning object 102 from structure 104 through adhesive bond 108 may be reduced by plurality of channels 130 in tuning object 102 (operation 1208), with the process terminating thereafter.

For example, without limitation, when structure 104 takes the form of blade 110, bending of blade 110 may cause load 135 to be generated, travel through composite structure 106 in blade 110, and be transferred to tuning object 102 through adhesive bond 108. The amount of load 135 transferred to tuning object 102 through adhesive bond 108 may be reduced by the reduction in the maximum length of continuous contact between tuning object 102 and adhesive bond 108 caused by the formation of plurality of channels 130.

In this manner, the possibility of undesired inconsistencies forming within adhesive bond 108 and/or adhesive bond 108 separating from tuning object 102 and/or composite structure 106 may be reduced. The strength and integrity of adhesive bond 108 may be maintained.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

In some illustrative embodiments, plurality of segments 126 and/or plurality of channels 130 may be altered after operation 1202 in FIG. 12 to change the mass of tuning object 102. For example, without limitation, the length of one or more of plurality of channels 130 may be increased to reduce the mass of tuning object 102. In another example, one or more of plurality of segments 126 may be removed or cut away to reduce the mass of tuning object 102.

Figure 13:
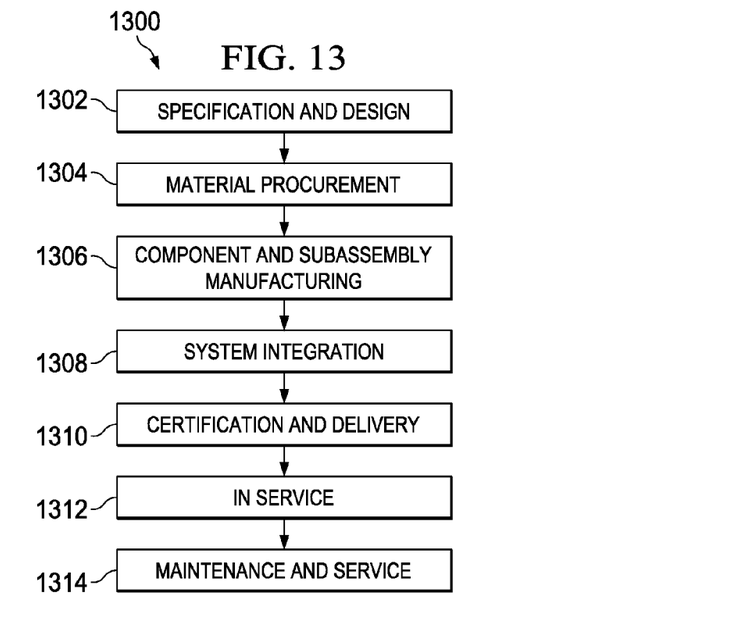
FIG. 13 is an illustration of an aircraft manufacturing and service method in the form of a block diagram in accordance with an illustrative embodiment.
Figure 14:
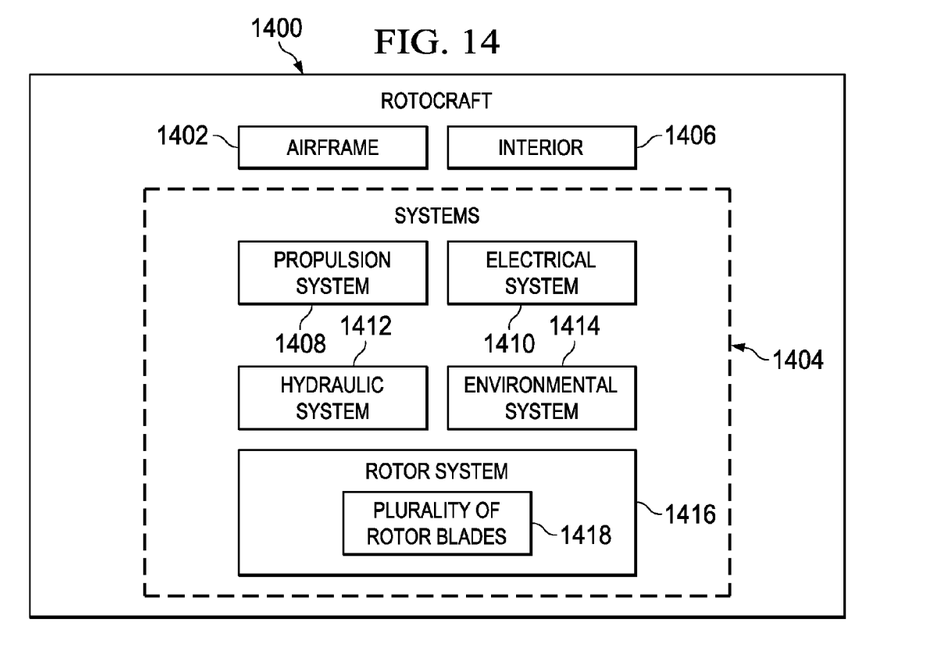
FIG. 14 is an illustration of a rotorcraft in the form of a block diagram in accordance with an illustrative embodiment.

Illustrative embodiments of the disclosure may be described in the context of aircraft manufacturing and service method 1300 as shown in FIG. 13 and rotorcraft 1400 as shown in FIG. 14. Turning first to FIG. 13, an illustration of an aircraft manufacturing and service method in the form of a block diagram is depicted in accordance with an illustrative embodiment. During pre-production, aircraft manufacturing and service method 1300 may include specification and design 1302 of rotorcraft 1400 in FIG. 14 and material procurement 1304.

During production, component and subassembly manufacturing 1306 and system integration 1308 of rotorcraft 1400 in FIG. 14 takes place. Thereafter, rotorcraft 1400 in FIG. 14 may go through certification and delivery 1310 in order to be placed in service 1312. While in service 1312 by a customer, rotorcraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of a rotorcraft in the form of a block diagram is depicted in which an illustrative embodiment may be implemented. In this example, rotorcraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, environmental system 1414, and rotor system 1416. Rotor system 1416 may comprise plurality of blades 1418. Any number of other systems may be included. Although an aerospace example is shown, different illustrative embodiments may be applied to other industries, such as the automotive industry or the marine industry.

Apparatuses and methods embodied herein may be employed during at least one of the stages of aircraft manufacturing and service method 1300 in FIG. 13. For example, without limitation, tuning object 102 from FIG. 1 may be installed within a blade in plurality of blades 1418. Tuning object 102 may be formed and installed in the blade during component and subassembly manufacturing 1306, system integration 1308, and/or routine maintenance and service 1314 in FIG. 13.

In one illustrative example, components or subassemblies produced in component and subassembly manufacturing 1306 in FIG. 13 may be fabricated or manufactured in a manner similar to components or subassemblies produced while rotorcraft 1400 is in service 1312 in FIG. 13. As yet another example, one or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while rotorcraft 1400 is in service 1312 and/or during maintenance and service 1314 in FIG. 13. The use of a number of the different illustrative embodiments may substantially expedite the assembly of and/or reduce the cost of rotorcraft 1400.

Thus, the different illustrative embodiments provide a tuning object, such as tuning object 102 in FIG. 1, which may be used to tune the mass of a foil, such as structure 104 in FIG. 1. Any number of tuning objects implemented in a manner similar to tuning object 102 in FIG. 1 may be used to tune the mass of the foil. Further, these tuning objects may be installed at various locations along the foil to adjust the position of the center of gravity of the foil relative to a pitch axis or some other axis through the foil. The tuning object described by the illustrative embodiments may be easier to install in a blade than a plurality of cylindrical weights.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a tuning object configured to be bonded to a structure to reduce a vibratory response of the structure in which the tuning object has a plurality of channels formed such that the tuning object has a selected mass, wherein the tuning object further comprises:
   a plurality of segments separated by the plurality of channels; and
   a connective segment configured to connect segments in the plurality of segments to each other.

2. The apparatus of claim 1, wherein the tuning object is configured to be bonded to the structure by an adhesive bond and wherein the plurality of channels is configured to reduce an amount of load transferred to the tuning object from the structure through the adhesive bond.

3. The apparatus of claim 2, wherein the plurality of channels is configured to reduce a maximum length of continuous contact between the tuning object and the adhesive bond such that the amount of load transferred to the tuning object from the structure through the adhesive bond is reduced.

4. The apparatus of claim 2, wherein the plurality of channels is configured to reduce the amount of load transferred to the tuning object from the structure through the adhesive bond such that shear stresses within the adhesive bond are reduced to within selected tolerances.

5. The apparatus of claim 1, wherein the plurality of segments is monolithic with the connective segment.

6. The apparatus of claim 1, wherein the plurality of channels is formed in a workpiece using a tool to form the tuning object having the selected mass.

7. The apparatus of claim 6, wherein the workpiece is comprised of a material having a density within a selected range.

8. The apparatus of claim 7, wherein the material is selected from one of tungsten and tantalum.

9. The apparatus of claim 6, wherein the tool is an electronic discharge machine.

10. The apparatus of claim 1 further comprising:
    the structure, wherein the structure is a rotor blade for a rotorcraft.

11. The apparatus of claim 10 further comprising:
    an adhesive bond configured to bond the tuning object to the rotor blade, wherein the adhesive bond comprises a layer of adhesive material.

12. The apparatus of claim 11, wherein the adhesive bond is configured to bond the tuning object to a composite structure in the rotor blade.

13. A rotor blade for a rotorcraft, the rotor blade comprising:
a composite structure;
a tuning object configured to be attached to the composite structure to reduce a vibratory response of the rotor blade in which the tuning object has a plurality of channels formed such that the tuning object has a selected mass and in which the tuning object comprises:
a plurality of segments separated by the plurality of channels; and
a connective segment configured to connect segments in the plurality of segments to each other in which the plurality of segments is monolithic with the connective segment; and
an adhesive bond configured to bond the tuning object to the composite structure in which the plurality of channels is configured to reduce an amount of load transferred to the tuning object from the composite structure through the adhesive bond such that shear stresses in the adhesive bond are reduced to within selected tolerances.

14. A method for reducing a vibratory response in a structure using a tuning object, the method comprising:
identifying a selected mass for the tuning object;
forming a plurality of channels in a workpiece having a mass greater than the selected mass to form the tuning object having the selected mass; and
bonding the tuning object to the structure using an adhesive bond to reduce the vibratory response of the structure.

15. The method of claim 14 further comprising:
reducing an amount of load transferred to the tuning object from the structure through the adhesive bond by the plurality of channels.

16. The method of claim 15 further comprising:
reducing shear stresses within the adhesive bond by reducing the amount of load transferred to the tuning object from the structure through the adhesive bond.

17. The method of claim 14, wherein the step of forming the plurality of channels in the workpiece having the mass greater than the selected mass to form the tuning object having the selected mass comprises:
removing portions of material from the workpiece to form the plurality of channels, wherein removing the portions of the material from the workpiece reduces the mass of the workpiece.

18. The method of claim 17, wherein the step of forming the plurality of channels in the workpiece having the mass greater than the selected mass to form the tuning object having the selected mass further comprises:
determining whether the workpiece having the plurality of channels has the selected mass within selected tolerances; and
responsive to a determination that the workpiece having the plurality of channels does not have the selected mass within the selected tolerances, removing additional material from the workpiece around at least one of the plurality of channels to reduce the mass of the workpiece to the selected mass.

19. The method of claim 17, wherein the step of removing the portions of material from the workpiece to form the plurality of channels comprises:
removing portions of material from the workpiece using an electronic discharge machine to form the plurality of channels.

20. The method of claim 14, wherein the step of forming the plurality of channels in the workpiece having the mass greater than the selected mass to form the tuning object having the selected mass comprises:
identifying a length for each of the plurality of channels to be formed based on the selected mass; and
forming the plurality of channels such that each channel in the plurality of channels has the length identified.

21. The method of claim 14, wherein the step of forming the plurality of channels in the workpiece having the mass greater than the selected mass to form the tuning object having the selected mass comprises:
forming the plurality of channels in the workpiece such that the workpiece is partially segmented into a plurality of segments in which segments in the plurality of segments are connected to each other by a connective segment.

22. The method of claim 21, wherein the step of forming the plurality of channels in the workpiece having the mass greater than the selected mass to form the tuning object having the selected mass further comprises:
identifying a length for each of the plurality of segments based on the selected mass identified; and
forming the plurality of channels in the workpiece such that the workpiece is partially segmented into the plurality of segments in which each segment in the plurality of segments has the length identified.

23. The method of claim 14, wherein the step of bonding the tuning object to the structure using the adhesive bond comprises:
applying a layer of adhesive material onto a surface of the structure;
placing the tuning object over the layer of adhesive material; and
curing the layer of adhesive material to form the adhesive bond between the tuning object and the structure.

24. The method of claim 23, wherein the step of bonding the tuning object to the structure using the adhesive bond further comprises:
applying an additional layer of adhesive material over the tuning object such that the additional layer of adhesive material covers the tuning object and a portion of the surface of the structure;
placing a laminate wrap over the additional layer of adhesive material; and
curing the additional layer of adhesive material to bond the laminate wrap to the tuning object and the structure, wherein the laminate wrap holds the tuning object in place relative to the structure.

25. A method for reducing a vibratory response of a rotor blade for a rotorcraft using a tuning object, the method comprising:
identifying a selected mass for the tuning object;
forming a plurality of channels in a workpiece comprised of a material having a density within a selected range by removing portions of material from the workpiece using an electronic discharge machine to form the tuning object having the selected mass;
bonding the tuning object to a composite structure in the rotor blade using an adhesive bond to reduce the vibratory response of the rotor blade;
reducing an amount of load transferred to the tuning object from the composite structure through the adhesive bond by the plurality of channels in the tuning object; and
reducing shear stresses within the adhesive bond by reducing the amount of load transferred to the tuning object from the composite structure through the adhesive bond.

* * * * *